(No Model.)   2 Sheets—Sheet 1.
C. D. RAAB.
ELECTRIC METER.
No. 524,953.   Patented Aug. 21, 1894.
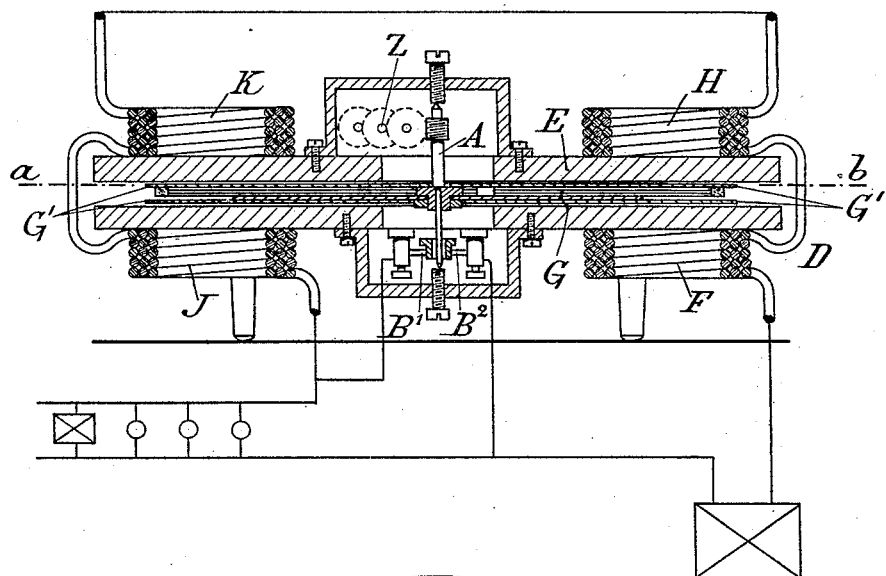
Fig. I.
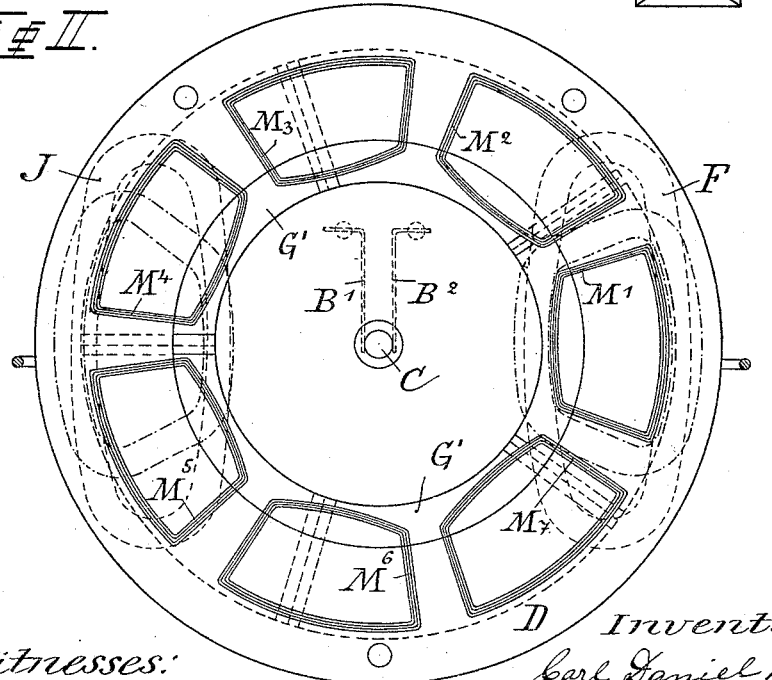
Fig. II.
Witnesses:
E. B. Bolton
H. van Oldenneel
Inventor:
Carl Daniel Raab
By Richards
his Attorneys.

(No Model.)  C. D. RAAB.  2 Sheets—Sheet 2.
ELECTRIC METER.
No. 524,953. Patented Aug. 21, 1894.
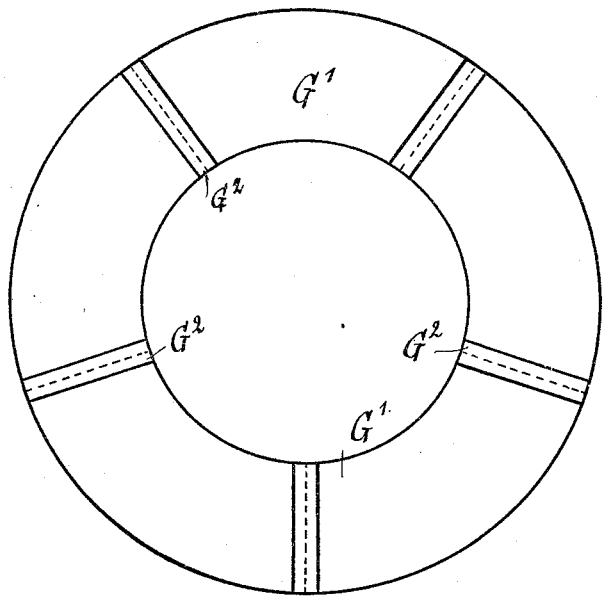
Fig. III.
Fig. IIII.
Witnesses:
E. B. Balton
H. van Oldenmeel
Inventor:
Carl Daniel Raab
By Richards
his Attorneys.

UNITED STATES PATENT OFFICE.

CARL DANIEL RAAB, OF KAISERSLAUTERN, GERMANY.

ELECTRIC METER.

SPECIFICATION forming part of Letters Patent No. 524,953, dated August 21, 1894.

Application filed January 18, 1894. Serial No. 497,281. (No model.)

*To all whom it may concern:*

Be it known that I, CARL DANIEL RAAB, a subject of the King of Bavaria, residing at Kaiserslautern Pallatia, Kingdom of Bavaria, Germany, have invented certain new and useful Improvements in Electric Meters; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The present invention relates to improvements in electric motor meters.

The object of the same is to remove the inaccuracies in the proportional relation between the power of the current and the number of revolutions, which is caused by an unforeseen and unaccountable stopping of the air between the armature and the damping plates.

In the annexed drawings Figure I, shows a vertical section of the improved electric motor meter. Fig. II, is a horizontal section on $a$—$b$. Figs. III and IV show the mica plates designed to attain the object of the invention.

A is the spindle of the revolving armature comprising the fine wire coils $M'$ to $M^7$ carried by mica disk G and connected with a commutator C in the manner of the Gramme armature. The armature coils $M'$ to $M^7$ have a high resistance, are constructed of many convolutions and are placed in a shunt to the main circuit so that they are traversed by a weak constant current. The armature revolves between two fixed copper disks D and E and stationary solenoid coils F, H, J, K, traversed by the current to be measured. The armature coils $M'$ to $M^7$ are switched into two parallel groups in the known way by the commutator C and brushes $B'$ and $B^2$ and the latter are so placed that the current of every coil of the armature is commutated when it is situated centrally between the coils H, F or the coils K, J so that the coils F H attract those armature coils that are repelled by the coils K J and conversely the coils F and H, repel those armature coils that are attracted by the coils K J whereby the armature is revolved and actuates the counting train Z with which its spindle is geared. When the armature is in the position shown in Fig. II, the coils F and H attract the armature coils $M^5$, $M^6$, $M^7$ and repel $M^2$, $M^3$, $M^4$ whereas the coils K and J attract $M^2$, $M^3$, $M^4$ and repel $M^5$, $M^6$ and $M^7$. At this moment the armature coil $M'$ is short circuited. Directly the armature coils move, their lines of force generate unipolar currents in the copper disks D and E whereby the surplus power of the motor, remaining after the friction of the mechanism has been overcome, is absorbed.

In order to make the measuring capacity of the motor meter as large as possible, it is necessary that the electro dynamic damping be increased as much as possible by diminishing the distance of the iron free armature from its metallic walls as much as possible. By doing so, however, an incalculable air damping occurs for the following reasons:

The revolution of the armature causes the air contained in the hollow space and in the intermediate space of the armature coils to come into friction because it is naturally carried along by the rotary motion.

When the distance is great, the friction is so little that it will have no noticeable influence upon the proportion between the power of the current and the number of revolutions.

When the distance is diminished as much as possible the air damping increases in a much greater proportion than the electro dynamic damping so that the proportion between the number of revolutions and the power of the current will be disturbed. In order to obviate this the iron free armature is inclosed in another envelope as can be seen in Figs. I and II. Said envelope consists of the two mica disks $G'$ of a thickness of about 0.15 millimeters. In this manner the armature will be converted in a smooth surfaced rotating body, as far as the adjacent copper walls are concerned.

The layer of air will not be carried along by the armature coils but will be located only between the mica plates $G'$ on one side and the copper plate D or E on the other side. Therefore the air disturbances cannot possibly occur.

Both mica plates $G'$ are very thin and have very little weight so as not to load the armature spindle and to diminish as slightly as possible the measuring capacity of the meter.

The mica plates G' shown in Figs. III and IV are preferably constructed of single parts pasted together by means of strips of mica G². They are fixed to the armature by gluing.

The drawings show the mica disks thicker than they are in reality and the distance from the metallic disks is larger than in the real construction. This is done to better illustrate the invention.

The best material for inclosing the armature is mica, but it is possible to use fine kinds of paper or celluloid plates or the like.

I claim—

An electric motor meter comprising, the revolving armature having the coils in a shunt, the damping disks adjacent to the armature, the stationary coils and conductors and the mica disks interposed between the armature and the damping disks whereby the air damping will be reduced, substantially as described.

In testimony whereof I have signed my name in presence of two witnesses.

CARL DANIEL RAAB.

Witnesses:
JULIUS KRAFFT, Junior,
EDWARD TONCHING.